(12) United States Patent
Kalbacher et al.

(10) Patent No.: US 7,748,442 B2
(45) Date of Patent: Jul. 6, 2010

(54) PLATE HEAT EXCHANGER

(75) Inventors: Klaus Kalbacher, Rangendingen (DE); Thomas Bräuning, Stuttgart (DE)

(73) Assignee: Modine Manufacturing Company, Racine, WI (US)

( * ) Notice: Subject to any disclaimer, the term of this patent is extended or adjusted under 35 U.S.C. 154(b) by 1016 days.

(21) Appl. No.: 11/046,512

(22) Filed: Jan. 28, 2005

(65) Prior Publication Data

US 2005/0205236 A1   Sep. 22, 2005

(30) Foreign Application Priority Data

Jan. 31, 2004  (DE) .................. 10 2004 004 975

(51) Int. Cl.
*G05D 23/00*  (2006.01)
*F28F 3/00*  (2006.01)
(52) U.S. Cl. .................... 165/299; 165/166; 165/167
(58) Field of Classification Search .............. 165/51, 165/166, 167, 176, 297, 299
See application file for complete search history.

(56) References Cited

U.S. PATENT DOCUMENTS

| | | | | |
|---|---|---|---|---|
| 1,992,097 A | * | 2/1935 | Seligman | 165/167 |
| 4,303,124 A | * | 12/1981 | Hessari | 165/167 |
| 4,503,908 A | * | 3/1985 | Rosman et al. | 165/167 |
| 4,653,581 A | * | 3/1987 | Yogo et al. | 165/166 |
| 4,708,199 A | * | 11/1987 | Yogo et al. | 165/167 |
| 4,742,866 A | * | 5/1988 | Yamanaka et al. | 165/167 |
| 5,042,577 A | * | 8/1991 | Suzumura | 165/176 |
| 5,078,209 A | * | 1/1992 | Kerkman et al. | 165/167 |
| 5,146,980 A | * | 9/1992 | Le Gauyer | 165/167 |
| 5,154,225 A | * | 10/1992 | Armbruster et al. | 165/51 |
| 5,165,468 A | | 11/1992 | Tajima et al. | |
| 5,513,702 A | * | 5/1996 | Tajima et al. | 165/167 |
| 5,950,715 A | * | 9/1999 | Jonsson et al. | 165/297 |
| 5,954,126 A | * | 9/1999 | Armbruster | 165/167 |
| 6,039,112 A | * | 3/2000 | Ruppel et al. | 165/166 |
| 6,182,749 B1 | * | 2/2001 | Brost et al. | 165/297 |
| 6,220,340 B1 | * | 4/2001 | Cheong et al. | 165/153 |
| 6,244,334 B1 | * | 6/2001 | Wu et al. | 165/166 |
| 6,340,053 B1 | * | 1/2002 | Wu et al. | 165/167 |
| 6,843,311 B2 | * | 1/2005 | Evans et al. | 165/167 |
| 7,036,565 B2 | * | 5/2006 | Brost et al. | 165/167 |
| 7,377,308 B2 | * | 5/2008 | Ware | 165/167 |

FOREIGN PATENT DOCUMENTS

| | | |
|---|---|---|
| DE | 41 25 079 A1 | 2/1992 |
| EP | 614 061 A1 | 9/1993 |
| WO | WO 94/29659 | 12/1994 |

* cited by examiner

*Primary Examiner*—Ljiljana (Lil) V Ciric
(74) *Attorney, Agent, or Firm*—Michael Best & Friedrich LLP

(57) ABSTRACT

A plate heat exchanger for cooling a first fluid by a second fluid, including a plurality of stacked heat exchanger plates forming separate flow channels therebetween with a cover plate on one side and a base plate on the other side of the stacked plates. The plates have a plurality of aligned openings defining inlet and outlet channels each communicating with selected ones of connected flow channels. In one form, the cover plate includes a conveying channel guiding one of the fluids to a desired position along the length of the heat exchanger, and the base plate includes a conveying channel guiding the other of the fluids to a desired position along the length of the heat exchanger. In another form, the conveying channels for both of the fluids are in the same one of the cover or base plate.

13 Claims, 3 Drawing Sheets

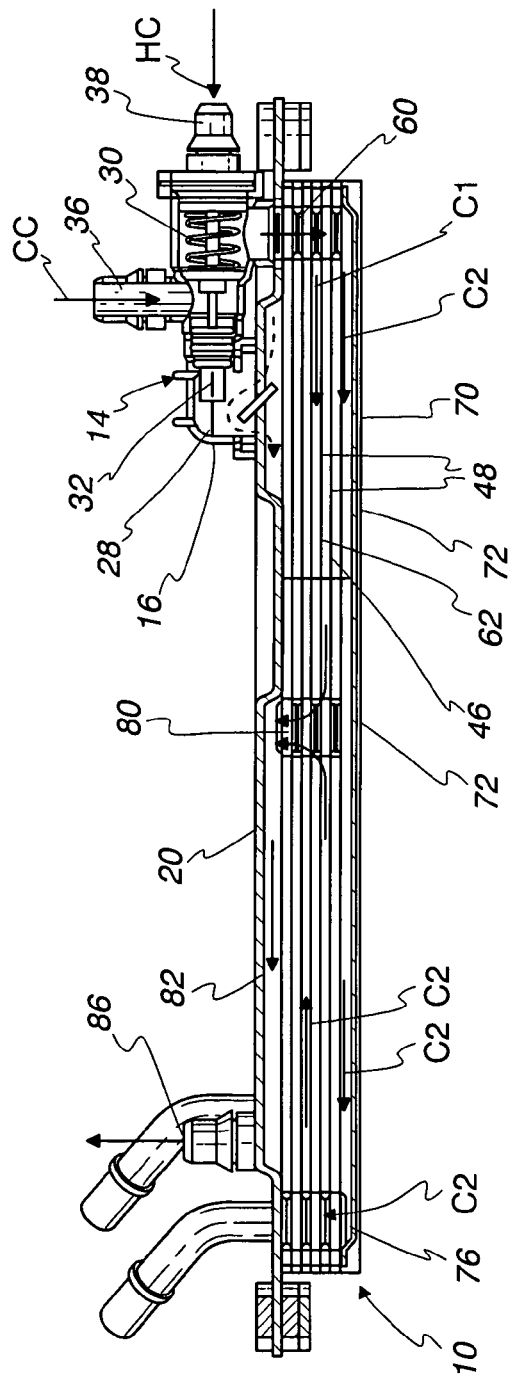
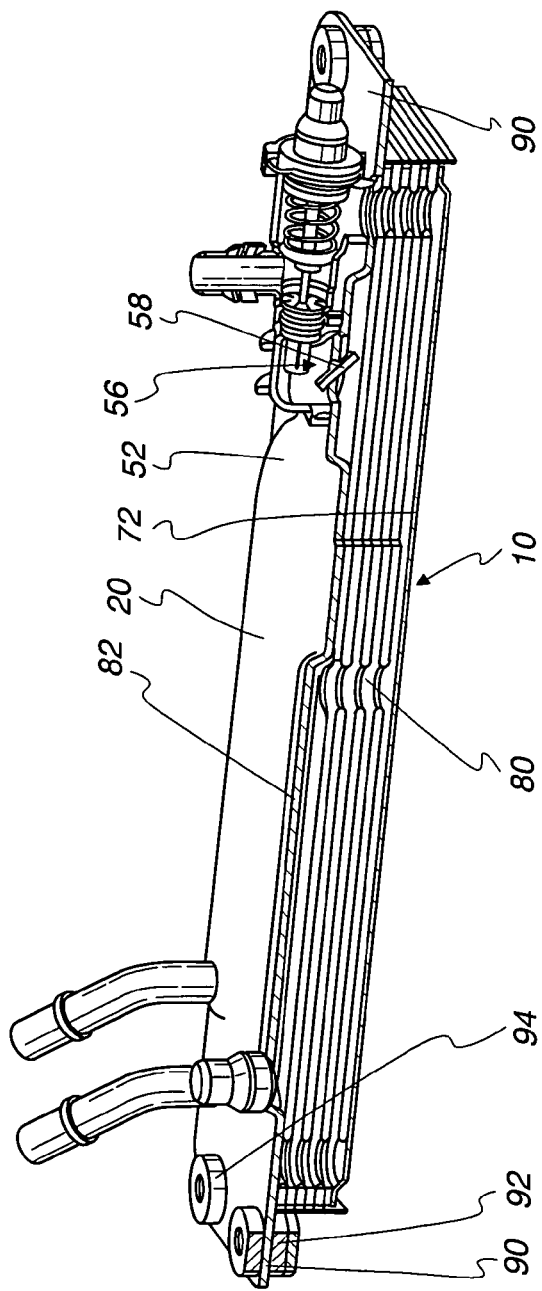
Fig. 3
Fig. 4

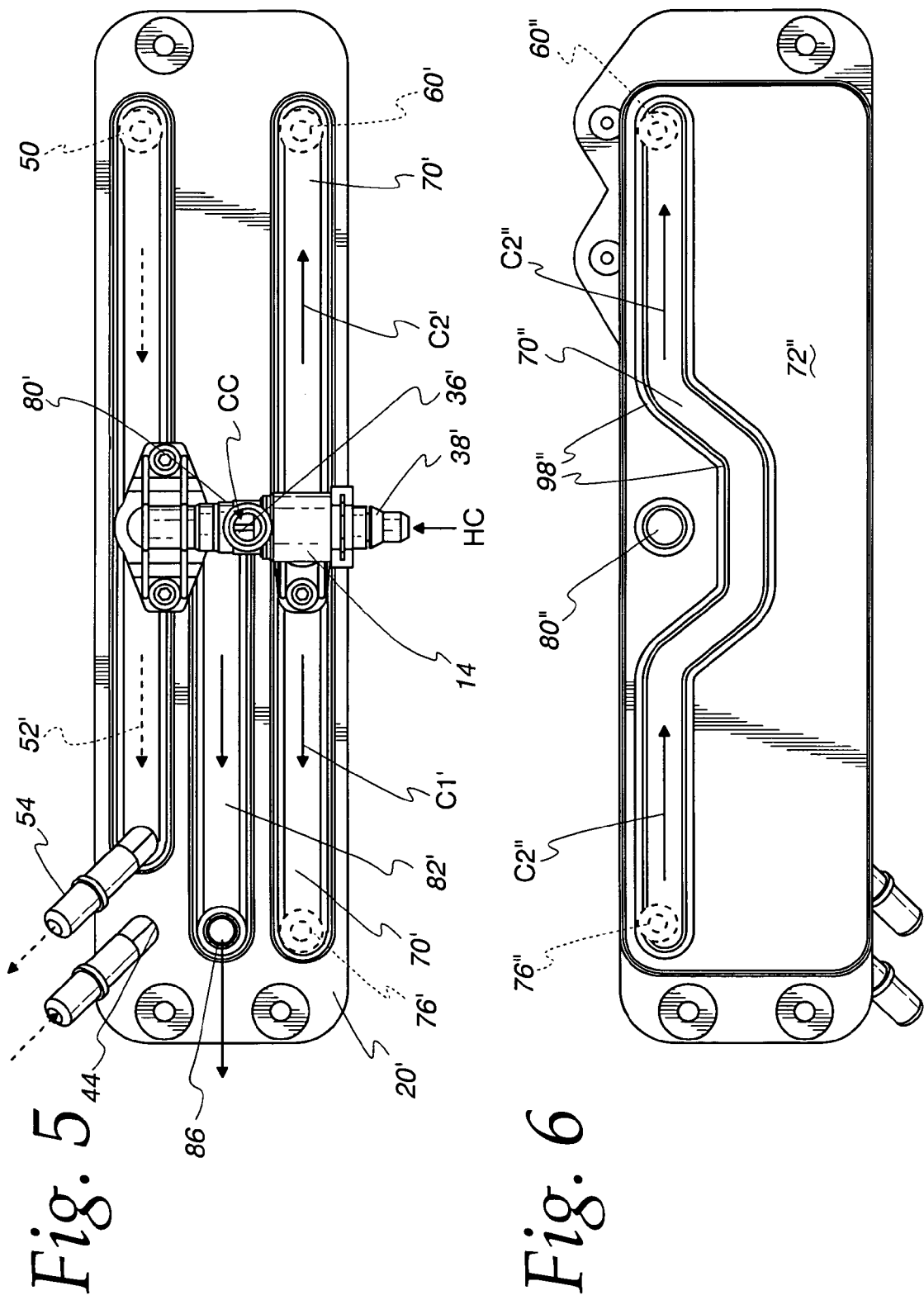

PLATE HEAT EXCHANGER

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention is directed toward heat exchangers, and particularly toward relatively long plate heat exchangers.

BACKGROUND OF THE INVENTION AND TECHNICAL PROBLEMS POSED BY THE PRIOR ART

Plate heat exchangers have been used, for example, with motor vehicles in order to control the temperature of the gear oil using the coolant of the vehicle engine. Such plate heat exchangers have included stacked heat exchanger plates, each of which have openings which form channels in the stack of heat exchanger plates and which serve to introduce and lead away the fluids from flow channels between the plates.

Such heat exchangers have been used in a wide variety of different environments in which the connections for the fluids may vary, as may the restricted space available for the heat exchanger. It is know to provide transfer channels with an upper plate and a lower plate in order to guide a fluid to a desired position of the inlet or outlet. Plate heat exchangers generally of this type are variously shown, for example, in DE 41 25 079 A1, WO 94/29659 and EP 614 061 A1. However, such designs have limited ability to economically adapt to the great variety of environments in which such heat exchangers might be used.

The present invention is directed toward overcoming one or more of the problems set forth above.

SUMMARY OF THE INVENTION

In one aspect of the present invention, a plate heat exchanger for cooling a first fluid by a second fluid is provided, including a plurality of stacked heat exchanger plates forming separate flow channels therebetween with a cover plate on one side and a base plate on the other side of the stacked plates. The plates have a plurality of aligned openings defining inlet and outlet channels each communicating with selected ones of connected flow channels. The cover plate includes a conveying channel guiding one of the fluids to a desired position along the length of the heat exchanger, and the base plate includes a conveying channel guiding the other of the fluids to a desired position along the length of the heat exchanger.

In one form of this aspect of the invention, one of the fluids is oil.

In another form of this aspect of the invention, a thermostat-control valve in a housing is provided on one of the base and cover plates, with the valve including a thermostat-control in the housing and the housing being in communication with flow of one of the fluids. In a further form, the valve housing includes a first connection to a first source of the one fluid and a second connection to a second source of the one fluid, and the fluid from the first source is a different temperature than the fluid from the second source and the valve adjusts communication with the first and second sources depending on the temperature of the other fluid. In another further form, the housing includes a chamber in which the thermostat-control is in contact with the other fluid and a compartment for the one fluid hydraulically connected to an inlet channel of the plate heat exchanger, where the compartment includes a first connector for connecting to a first source of the one fluid and a second connector for connecting to a second source of the one fluid, the first and second sources having fluid having different temperatures. In a still further form, the plate having the conveying channel carrying the other fluid includes a cut-out with a flow-deflection element for guiding the other fluid into the chamber.

In still another form of this aspect of the present invention, the conveying channel in one of the cover and base plate transfers one of the fluids from a heat exchange outlet to a desired position along the one plate.

In yet another form of this aspect of the present invention, the flow channels for one of the fluids extend between an inlet for the one fluid and an outlet for the one fluid, the one fluid inlet and the one fluid outlet being substantially at opposite longitudinal ends of the heat exchanger, and the inlet channel for the other of the fluids divides the other fluid into first and second partial streams. The first partial stream enters the flow channels for the other of the fluids at one end of the heat exchanger. The second partial stream flows from the one end of the heat exchanger through one of the conveying channels to the opposite end of the heat exchanger and enters the flow channels for the other of the fluids at the opposite end of the heat exchanger. In one direction of flow of the other fluid, the first and second partial streams have converging flow in the flow channels and, in an opposite direction of flow, have diverging flow in the flow channels.

In a further form, a middle channel for the flow channels of the other fluid is provided, where the middle channel is an outlet of converging flow when the other fluid flows in the one direction, and is inlet for diverging flow when the other fluid flows in the opposite direction. In a still further form, the middle channel communicates with one of the conveying channels, with the one conveying channel communicating with a connector located at a distance from the middle channel along the longitudinal direction of the heat exchanger. In a still further form, the connector is an outlet connector.

In another aspect of the present invention, a plate heat exchanger for cooling a first fluid by a second fluid is provided, including a plurality of stacked heat exchanger plates forming separate flow channels therebetween. The plates have a plurality of aligned openings defining inlet and outlet channels each communicating with selected ones of connected flow channels. At least one upper plate and at least one lower plate are provided on opposite sides of the stacked plates, with a first conveying channel in one of the upper and lower plates guiding one of the fluids to a desired position along the length of the heat exchanger and a second conveying channel in the same plate, the second conveying channel being a transfer channel for guiding the other of the fluids to a desired position along the length of the heat exchanger.

In one form of this aspect of the present invention, a second transfer channel for the other of the fluid is arranged on one of the upper and lower plates.

BRIEF DESCRIPTION OF THE DRAWINGS

FIG. 3 is a side cross-sectional view of the FIG. 1 heat exchanger;

FIG. 4 is a perspective section view similar to FIG. 3;

FIG. 5 is a top view an alternate embodiment plate heat exchanger according to the present invention;

FIG. 6 is a bottom view of yet another alternative embodiment of the present invention.

DETAILED DESCRIPTION OF THE INVENTION

Figure 1:
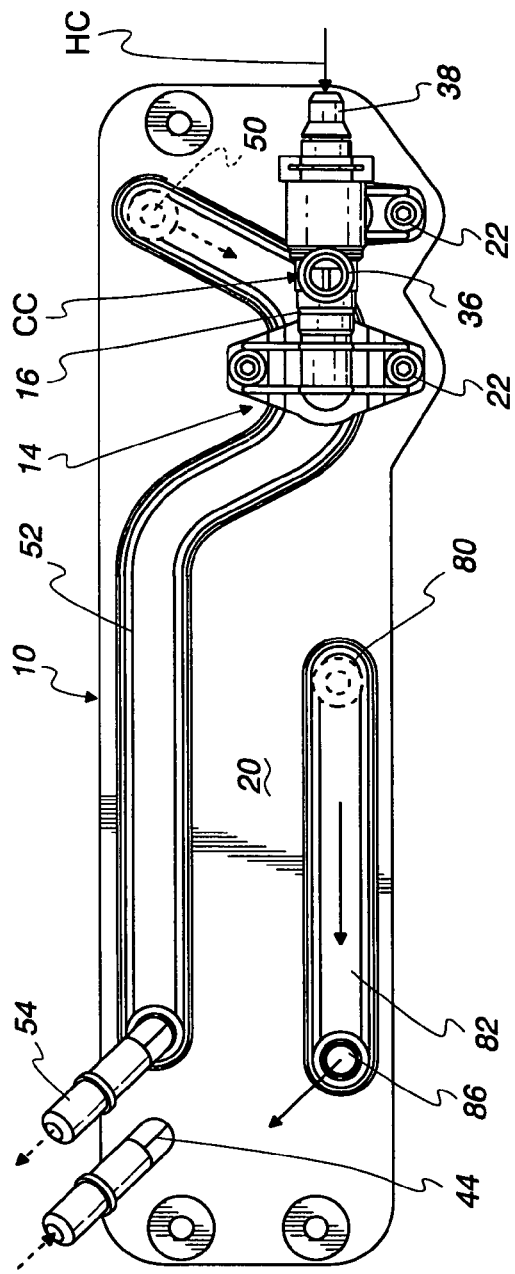
FIG. 1 is a top view of one embodiment of a plate heat exchanger according to the present invention.

The plate heat exchanger 10 according to the present invention and illustrated in the Figures is a gear oil cooler, which may be used, for example, in a motor vehicle in order to control the temperature of the gear oil using the coolant of the vehicle engine.

As also disclosed in our U.S. patent application entitled "Thermostat-Control Valve for Heat Exchanger" (filed on the same day as the present application), the disclosure of which is hereby incorporated by reference, a thermostat-control valve 14 is provided for controlling the temperature of the coolant based on the oil temperature to provide a desired advantageous temperature of the oil as cooled by the heat exchanger 10. The valve 14 may be suitably mounted in a housing 16 which is secured on one of the heat exchanger plates (e.g., the cover plate 20), as by suitable fasteners 22.

As best illustrated in FIGS. 3 and 4, the housing 16 has a chamber 28 hydraulically separated from a compartment 30. A thermostat 32 protrudes into the chamber 28, and suitable elements of the control valve 14 (e.g., valve rod, valve plate, etc.) extend into compartment 30, with hydraulic separation achieved with seals on the thermostat 32. On the housing 16 which forms the compartment 30, there is a connection 36 for cooled coolant fluid CC and another connection 38 for preheated coolant HC. Depending on the actual temperature of the oil to be cooled (as measured in chamber 28), the thermostat 32 will suitably adjust (e.g., by moving the valve rod with the valve plate) in such a way that either only cooled coolant CC, only heated coolant HC or a mixture of CC and HC will flow from the compartment 30 into the inlet channel 40 for the coolant of the plate heat exchanger 10. It should be appreciated, however, that the illustrated thermostat-control valve 14 and related structure is merely one example of a type of control which may be advantageously used with the present invention in order to keep or bring the gear oil as close as possible to the optimum desired temperature. It should be appreciated that still other coolant control structures could be used. It should still further be appreciated that, depending upon the environment, heat exchangers employing other aspects of the present invention could be advantageously used without such a coolant control system as well.

Oil flow through the heat exchanger (indicated by dashed arrows, whereas coolant flow is indicated by solid arrows) is as follows. Oil enters the heat exchanger 10 through the oil inlet connector 44, from which it is suitably distributed through alternate flow channels 46 between the heat exchanger plates 48, such as is known to those skilled in the art. Oil exits the flow channels 46 into the outlet channel 50 and passes through the outlet channel 50 to a conveying channel 52 formed in the cover plate 20. The oil flows through the outlet channel 52 to the outlet connector 54 of the heat exchanger 10. Thus, it can be seen that the oil inlet and outlet connectors of the heat exchanger 10 may be advantageously provided at many different positions, depending upon the requirements of the system with which it is used, by the simple expedient of forming different conveying channels in the cover plate 20.

In the conveying channel 52 for the oil, there is a cut-out 56 with a flow-deflecting element 58 which guides the cooled oil into the chamber 28 and to the thermostat 32 (such flow being indicated by the dashed arrow in FIG. 3), whereby the thermostat 32 may advantageously detect the temperature of the oil after cooling in the heat exchanger 10 to determine whether more or less cooling is desirable, and adjust the mix of cool and preheated coolant CC and HC accordingly.

Flow of the coolant will now be described. As previously indicated, coolant flow is indicated in the figures by solid arrows.

The desired mixture of coolant flows from the compartment 30 to the coolant inlet channel 60, from which it is divided into two partial streams: partial stream C1 which enters there into coolant flow channels 62 between the heat exchanger plates 48, and partial stream C2 which flows through a transfer channel 70 formed in the bottom or base plate 72.

Though only a single arrow C1 is shown in FIG. 3, it should be understood that there advantageously are multiple coolant flow channels 62 through which partial stream C1 is split. The coolant flow channels 62 typically alternate with the oil flow channels 46, with suitable openings and closures provided around the coolant inlet channel 60 to connect the coolant inlet channel 60 with the coolant flow channels 62 (and separate the coolant inlet channel 60 from the oil flow channels 46).

Figure 2:
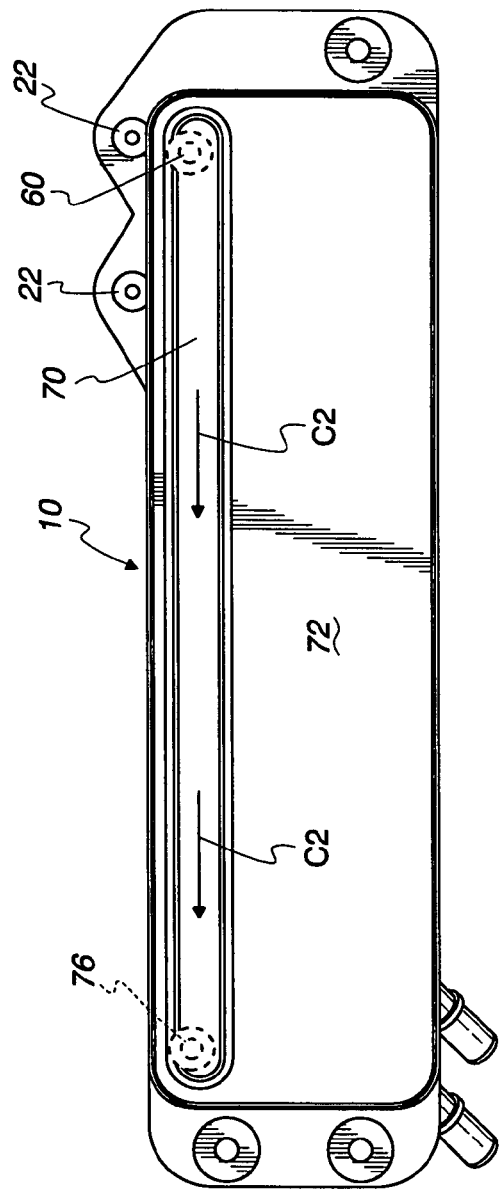
FIG. 2 is a bottom view of the FIG. 1 heat exchanger.

Partial stream C2 flows through the transfer channel 70 to the diametrically opposed end of the plate heat exchanger 10, where it enters a second coolant inlet channel 76 and, from that channel 76, passes through the coolant flow channels 62 in a direction which is substantially concurrent with the oil flow in the oil flow channels 46 (i.e., from left to right in FIGS. 1-4), and substantially counter to the flow direction of partial stream C1 in the coolant flow channels 62 (from right to left in FIGS. 1-4) (i.e., the two partial flows converge).

A coolant outlet channel 80 is arranged approximately in the middle of the plate heat exchanger 10, whereby the coolant of both partial streams C1, C2 exits the coolant flow channels 62 and, from there, flows into a second transfer channel 82, arranged on the cover plate 20, leading to outlet connection 86 for the coolant. The outlet connection 86 and the outlet channel 80 are at a distance from one another. Thus, it can be seen that the coolant inlet and outlet connectors of the heat exchanger 10 may be advantageously provided at many different positions, depending upon the requirements of the system with which it is used, by the simple expedient of forming different transfer channels in the cover and/or base plate 20, 72. Moreover, it should be appreciated that the coolant flow could readily be reversed if desired, with the partial streams of coolant in that case having a divergent flow direction in the flow channels 62.

Thus, with the present invention, it has become possible to guide the inlets and outlets for both media to freely-selectable positions in the regions of the base plate 72 and cover plate 20. This is done by appropriate design of the conveying and transfer channels 50 70, 82, each of which can have any arbitrary form. It can be seen from this that, as a result of the invention, the connection possibilities of the heat exchanger can be improved significantly in very tight housings.

It should also be appreciated that the division of the coolant streams into partial streams C1m C2 can be influenced in the desired direction by, for example, dimensioning of flow channels 62 and transfer channels 70, 82 appropriately, and/or by corresponding choice of channel lengths in the desired direction. Moreover, it should be appreciated that the present invention may be particularly advantageous with plate heat exchangers which have a relatively small number of relatively long flow channels 46, 62, in order to reduce pressure loss.

As illustrated particularly in FIG. 4, the cover plate 20 of the plate heat exchanger 10 may advantageously include a projection 90 which protrudes above the stack formed from heat exchanger plates 48, which projection 90 may be advantageously used to make a suitable vibration-damping fastening 92, 94 of the plate heat exchanger 10 to the system with which it is used.

An alternate structure embodying the present invention is shown in FIG. 5 which is substantially similar to the embodiment shown in FIGS. 1-4. Accordingly, the same reference numbers are used for the same parts, wherein a prime ("'") has been added to similar but slightly modified parts.

With this alternate embodiment, the positions of the oil inlet connector 44 and oil outlet connector 54 are unchanged. The transfer channels 70', 82' and the conveying channel 52' are straight and located in one of the plates (cover plate 20' in this example), although it should be appreciated that any arbitrary shape could have been used, including a curved shape. A thermostat-control valve 14 is also included on the cover plate 20' with this embodiment (though it could be arranged in other locations) and it should be appreciated that this valve 14 may be the same as described with the first described embodiment (though turned ninety degrees and located centrally relative to the cover plate 20').

As should be appreciated by the solid arrows in FIG. 5, the coolant stream in this embodiment enters the heat exchanger at about its center and then is split into the two partial streams C1', C2' to flow in opposite directions through the transfer channel 70' to the two diametrically opposed ends of the plate heat exchanger to the inlet channels 60', 76'.

FIG. 6 illustrates yet another embodiment of the present invention, in which the transfer channel 70' has bends 98 (the same reference numbers are used for the same parts with this embodiment, wherein a double prime ("''") has been added to similar but slightly modified parts. Such a configuration could be advantageously used, for example, in a heat exchanger which is to be used in an environment in which the coolant outlet is desired to be in the middle of the bottom plate 72". From these examples, it should thus be appreciated that the conveying and transfer channels may be easily manufactured in a wide variety of configurations, as may be desired to accommodate the position of various components, such as inlet and outlet connectors, based on system design requirements. Such simplicity of manufacture may readily use common core components, such as the plates 48, with essentially one the bottom and/or top plates requiring modification for different environment requirements.

Accordingly, it should be appreciated that heat exchangers according to the present invention may be advantageously used to inexpensively provide for advantageous use in many different applications (e.g., with motor engines in a wide variety of vehicles) in which a wide variety of configurations for connecting the heat exchanger to the supply of both fluids may be required. Further, it should be appreciated that the present invention may also be used to provide cooling in an environment in which the heat exchangers is relatively long, and to provide such operation with minimized pressure loss despite such configuration.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. A plate heat exchanger in which a first fluid is cooled by a second fluid, comprising:
   a plurality of stacked heat exchanger plates forming flow channels therebetween, the plates having a plurality of aligned openings defining inlet and outlet channels each communicating with selected ones of the flow channels;
   a cover plate on one side of the stacked heat exchanger plates, said cover plate at least partially defining a first conveying channel guiding one of said first and second fluids to a desired position along the length of said heat exchanger; and
   a base plate on another side of the stacked heat exchanger plates, said base plate at least partially defining a second conveying channel guiding another of said first and second fluids to a desired position along the length of said heat exchanger.

2. The plate heat exchanger of claim 1, wherein one of said first and second fluids is oil.

3. The plate heat exchange of claim 1, further comprising a thermostat-control valve in a housing on one of said base and cover plates, said valve including a thermostat-control in said housing, said housing further in communication with one of said fluids.

4. The plate heat exchanger of claim 3, wherein said valve housing includes a first connection to a first source of said one of said first and second fluids and a second connection to a second source of said one of said first and second fluids, said first source fluid being a different temperature than said second source fluid, whereby said valve adjusts communication with said first and second sources depending on the temperature of the other of said first and second fluid.

5. The plate heat exchanger of claim 3, wherein said housing includes:
   a chamber in which said thermostat-control is in contact with said other of said first and second fluids; and
   a compartment for said one of said first and second fluids hydraulically connected to an inlet channel of the plate heat exchanger, said compartment including a first connector for connecting to a first source of said one of said first and second fluids and a second connector for connecting to a second source of said one of said first and second fluids, the fluid from said first and second sources having different temperatures.

6. The plate heat exchanger of claim 5, wherein the plate having the conveying channel guiding said other of said first and second fluids includes a cut-out with a flow-deflection element for guiding the other of said first and second fluids into the chamber.

7. The plate heat exchanger of claim 1, wherein one of said first and second conveying channels in one of said cover and base plates transfers one of said first and second fluids from a heat exchange outlet to a desired position along said one of said cover and base plates.

8. The plate heat exchanger of claim 1, wherein:
   said flow channels for one of said first and second fluids extend between an inlet and an outlet for said one of said first and second fluids, said inlet and said outlet being substantially at opposite longitudinal ends of said heat exchanger; and the inlet channel for the other of said first and second fluids divides said other of said first and second fluids into
- a first partial stream entering said flow channels for the other of said first and second fluids at one end of said heat exchanger, and
- a second partial stream which flows from said one end of said heat exchanger through one of said first and second conveying channels to the opposite end of the heat exchanger, said second partial stream entering said flow channels for the other of said first and second fluids at said opposite end of said heat exchanger;
- whereby in one direction of flow of said other of said first and second fluids, the first and second partial streams have converging flow in said flow channels and in an opposite direction of flow have diverging flow in said flow channels.

9. The plate heat exchanger of claim 8, further comprising a middle channel for said flow channels of said other of said first and second fluids, said middle channel comprising an outlet of converging flow when said other of said first and second fluids flows in said one direction and said middle channel comprising an inlet for diverging flow when said other fluid flows in said opposite direction of flow.

10. The plate heat exchanger of claim 9, wherein said middle channel communicates with one of said first and second conveying channels, said one of said first and second conveying channel communicating with a connector located at a distance from the middle channel along the longitudinal direction of the heat exchanger.

11. The plate heat exchanger of claim 10, wherein said connector is an outlet connector.

12. A plate heat exchanger in which a first fluid is cooled by a second fluid, comprising:
- a plurality of stacked heat exchanger plates forming flow channels therebetween, the plates having a plurality of aligned openings defining inlet and outlet channels each communicating with selected ones of the flow channels;
- at least one upper plate and at least one lower plate on opposite sides of the stacked plates;
- a first conveying channel at least partially defined by one of said upper and lower plates, the first conveying channel guiding one of said first and second fluids to a desired position along the length of said heat exchanger; and
- a second conveying channel at least partially defined by another of said upper and lower plates, said second conveying channel being a transfer channel for guiding the other of said first and second fluids to a desired position along the length of said heat exchanger.

13. The plate heat exchanger of claim 12, wherein a second transfer channel for the other of said first and second fluids is arranged on one of the upper and lower plates.

\* \* \* \* \*